(12) United States Patent
Burkitt

(10) Patent No.: US 6,834,827 B2
(45) Date of Patent: Dec. 28, 2004

(54) WIRE PULLING APPARATUS HAVING ADJUSTABLE ORIENTATION AND PULL ANGLE

(76) Inventor: Scott Burkitt, 1673 U.S. 52, Dixon, IL (US) 61021

( * ) Notice: Subject to any disclaimer, the term of this patent is extended or adjusted under 35 U.S.C. 154(b) by 15 days.

(21) Appl. No.: 10/175,988

(22) Filed: Jun. 20, 2002

(65) Prior Publication Data

US 2003/0234317 A1 Dec. 25, 2003

(51) Int. Cl.[7] .......................... B65H 49/32; B65H 75/40
(52) U.S. Cl. .................. 242/557; 242/566; 242/588; 242/592; 242/594.4; 242/594.5; 242/594.6
(58) Field of Search ................. 242/557, 566, 242/588, 594, 594.3, 594.5, 597, 597.7, 597.8, 598.3, 598.4, 615.1, 615.2, 615.3, 129.6, 129.62, 130.3, 130.4, 139, 140, 157 R, 559.1, 559.4, 594.1, 594.2, 594.4, 594.6, 591, 592, 399, 399.1, 399.2, 397.1, 397.2, 397.3, 397.4, 403.1, 388.6; 280/47.19, 47.24, 47.35; 254/134.3 R

(56) References Cited

U.S. PATENT DOCUMENTS

| | | | |
|---|---|---|---|
| 204,692 A | * 6/1878 | White | 242/140 |
| 1,053,159 A | * 2/1913 | Crush | 242/591 |
| 2,705,114 A | * 3/1955 | Worsham | 242/594.4 |
| 3,304,025 A | * 2/1967 | Zerg et al. | 242/129 |
| 3,317,149 A | * 5/1967 | Gooch | 242/564.4 |
| 3,601,365 A | * 8/1971 | Hall | 254/134.7 |
| 3,937,414 A | * 2/1976 | Bank et al. | 242/557 |
| 3,990,653 A | * 11/1976 | Marcell | 242/129.8 |
| 4,457,527 A | * 7/1984 | Lowery | 280/47.19 |
| 4,564,152 A | * 1/1986 | Herriage | 242/422.4 |
| 4,579,358 A | * 4/1986 | Byfield, Jr. | 280/79.11 |
| 4,611,645 A | * 9/1986 | Whisnant | 242/129.5 |
| 4,869,344 A | * 9/1989 | Peterson | 182/129 |
| 5,509,671 A | 4/1996 | Campbell | |

OTHER PUBLICATIONS

*Capital/Construction Site Equipment*, Buyer's Guide, Mid–Jun. 2001, p. 40.
Greenlee Catalog, pp. 125, 129, 130 and unnumbered.
*Fishing & Cable Pulling*, GREENLEE Cable Pullers & Feeders, at http://www.greenlee.textron.com/products/fishing–pulling.html (last visited Mar. 28, 2002).
Wire Rack 8, Wire Rack USMFG, at http://seasurf.com/~usmfg/wirerack.htm (last visited Mar. 27, 2002).

* cited by examiner

*Primary Examiner*—John M. Jillions
(74) *Attorney, Agent, or Firm*—Leydig, Voit & Mayer, Ltd.

(57) ABSTRACT

A wiring cart for use by electricians is provided whose wire collator outlet from which the wires are drawn is adjustable relative to the position of the conduit opening through which the wires are to be pulled. Such adjustability is provided in one embodiment by adjustable legs that vary the height of at least one end of wire cart. The frame of the wire cart is constructed to allow the cart to be stood on end to aid in the installation of wires through a junction box or in overhead installations. Adjustable wall spacers may also be included to provide a fixed relative positioning relative to the wall. Modular expansion of the number of spools from which wire may be pulled is also provided by stacking, vertically or horizontally, a number of such wire carts. Portability is facilitated by wheels on which the wire cart may be rolled.

16 Claims, 16 Drawing Sheets

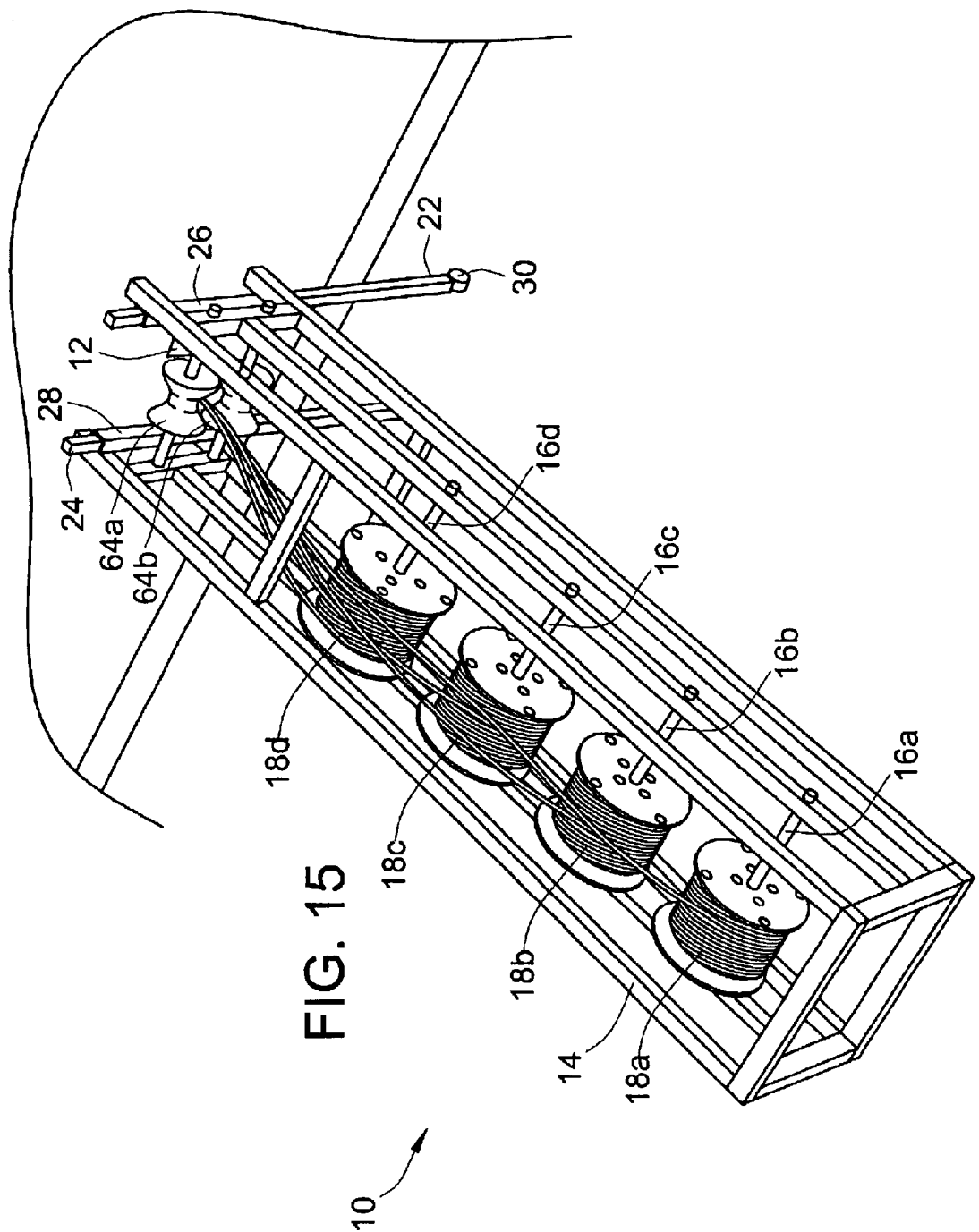

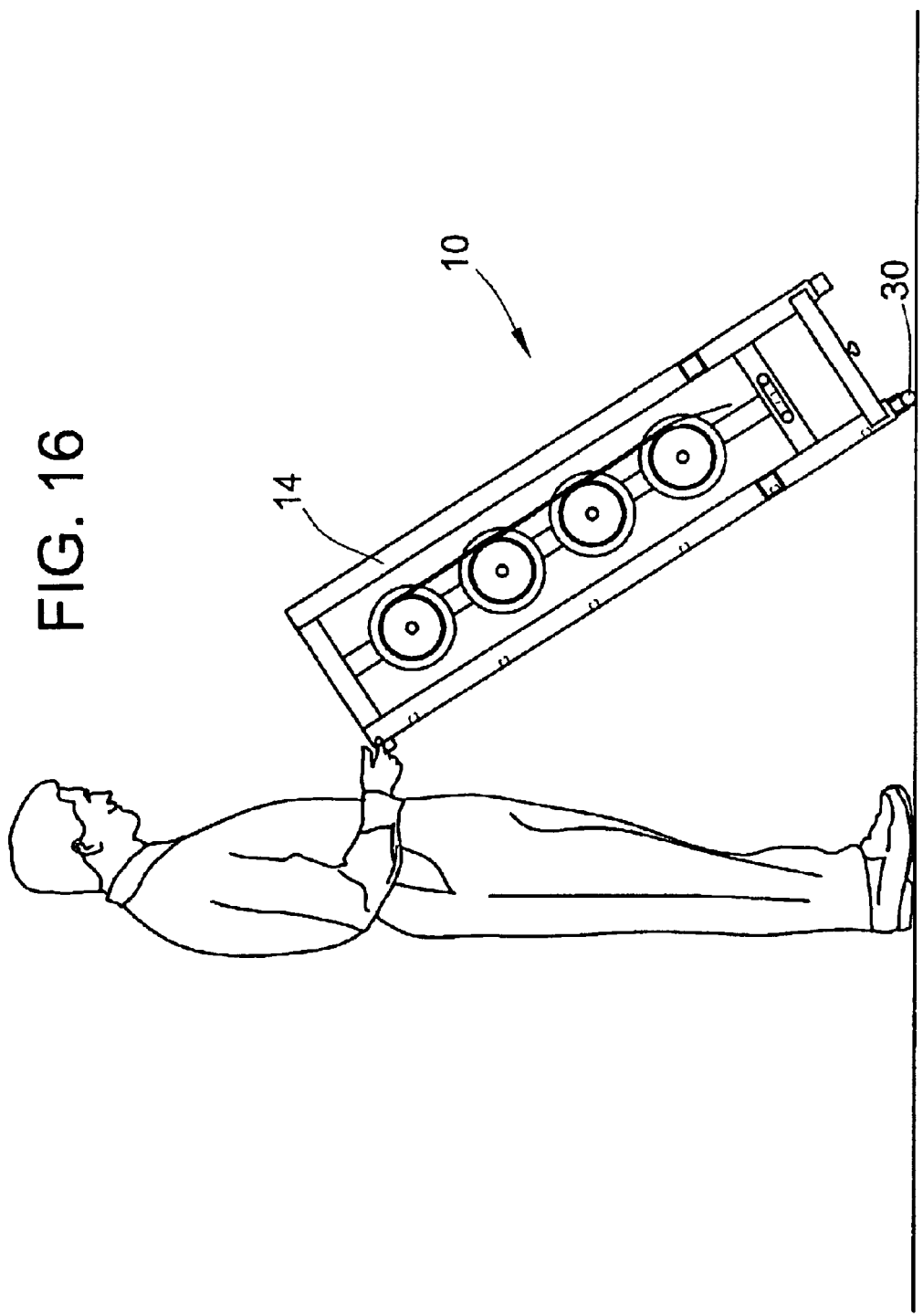

WIRE PULLING APPARATUS HAVING ADJUSTABLE ORIENTATION AND PULL ANGLE

FIELD OF THE INVENTION

The present invention relates generally to wire pulling apparati, and more particularly to wire caddies and wire carts that accommodate wire pulling from multiple spools of wire.

BACKGROUND OF THE INVENTION

The wiring of a new residence or business, and often the remodeling of existing residences or businesses requires that an electrician physically pull an appropriate number of wires through an electrical conduit so that the appropriate electrical connections may be made from the junction box to the end termination. These terminations may include switchboxes, outlets, or connectors to the physical device to which the wire is to be connected. In most modern structures, the number of wires that must be run has increased dramatically as the number of electrical, phone, computer, intercom, stereo, etc., lines have increased. Indeed, in many modern buildings, the total length of wire that is run can exceed several hundreds or thousands of miles.

To aid electricians in the proper connections of these various wires, wire manufacturers provide different colored insulation on the wires. In this way, a skillful electrician will maintain a color key indicating which colored insulation wire is connected to what. However, while different colored insulation significantly simplifies the task of identifying which wire is connected to which terminal/device, the sheer number of wires that needs to be run mandates that the electrician utilize numerous spools of wire. Recognizing that pulling wire from a large number of spools will quickly lead to a tangled mess of wires, manufacturers provide wire carts or caddies that hold the multiple spools of colored wire. Through the use of a wire cart or caddy, the electrician may pull multiple colored wires from a single location at once without fear of creating a large tangle.

A typical wire cart or caddy includes a fixed number of rods on which different colored spools of wire may be placed. The spools of wire are free to rotate on the rods so that wire may be pulled therefrom by the electrician. Recognizing that multiple spools of wire are quite heavy, many wire carts are constructed on some type of rolling base, often including two fixed and two swivel-locking casters. However, some smaller versions that hold only a few spools of wire are not provided with wheels.

While the provision of a wire cart is a significant benefit to electricians who are required to pull multiple wires, a number of problems have become evident with existing wire carts. Manufacturers of the wire cart recognize that different jobs may require differing numbers of wires to be pulled, and have therefore designed standalone wire carts having different numbers of rods onto which spools may be placed. Four, six, and ten rod cart capable of holding four, six, or ten different spools of wire are readily available. However, each of these wire carts are standalone units. As such, electricians are often forced to decide between having to use multiple wire carts at one work site requiring a large number of wires to be pulled when they own a four or six spool wire cart, or purchasing a larger ten spool capacity wire cart and facing unused capacity at work sites that do not require a large number of wires to be pulled. In the first case multiple trips to move the numerous stand alone wire carts between installation locations is required, while in the second case the larger and heavier wire cart must be moved between installation locations, requiring extra effort on the electricians part when such capacity is not even required. In either event the excess energy required by the electrician is unjustified.

Another problem which has become evident through the use of conventional wire carts available currently is that they are of fixed construction in the placement and orientation of the spools of wire. That is, the height above the floor of each of the rods onto which the spools of wire are placed are fixed. Unfortunately, the opening through which these wires must be pulled is often not fixed relative to the floor. As a result, the insulation on many of the wires is often scraped during the wiring pulling process. Wires are particularly susceptible to such damage when they are to be pulled through a conduit opening near the floor through a vertically upward conduit when the spools of wire on the wire cart are higher than the conduit opening. This results from the fact that the wire coming off of the spools must first be pulled in a downward direction to the conduit opening and then to an immediate upward direction through the conduit. All of the wires then tend to scrape along the upper edge of the conduit opening as the force pulling the wires upward through the conduit must first pull the wire downward from the spools. This results in a V shaped path that the wires must traverse. Similarly, if the conduit opening through which the wires must be pulled is above the fixed height of the spools on the wire cart and the wires must be pulled in a vertical downward direction through the conduit itself, this same type of damage to the wires may result.

Because the loss of insulation on an electrical wire poses a serious fire risk, such installations typically require at least two electricians, one of whom is simply responsible for feeding the wire through the conduit opening in a manner that prevents such damage. Alternatively, the electrician is forced to continually move the wire cart between different floors so that the flow of wire off of the wire cart will be in the direction that the wire will be pulled through the conduit. However, this is very inefficient as a single conduit opening may require that wires be pulled in both directions therethrough. Instead of being able to leave the wire cart at that location for each of the pulling operations, electricians will be forced to move the wire cart to a different floor and then pull the wire in the opposite direction to prevent the damage to the wire insulation. Unfortunately, each of these workarounds to this problem results in increased labor costs in performing a wiring operation.

There is a need in the art, therefore, for a wiring cart which is modular in design and which may be reoriented to allow wire pulling operations in either upward or downward directions based on the location of the conduit opening through which the wire is to be pulled.

BRIEF SUMMARY OF THE INVENTION

In view of the foregoing, it is an objective of the present invention to provide a new and improved wire cart that overcomes a number of the problems existing with current wire carts known in the art. More specifically, it is an objective of the present invention to provide a new and improved wire cart whose orientation relative to a conduit opening may be adjusted to minimize the potential damage to the wire insulation when pulled through the conduit opening. To keep the wires from the spools from tangling, a preferred embodiment maintains the spools in-line within the wire cart. Further, an embodiment of the wire cart of the present invention allows for modular expansion of the number of spools from which wire may be concurrently pulled. As such, more or fewer spools may be included in an assemblage as required by a particular job.

In accordance with one aspect of the present invention, the vertical orientation of an end of the wire cart from which the single or multiple strands of wire are pulled may be adjusted relative to the conduit opening through which the wires are to be pulled. In an installation having a conduit opening relatively close to the floor and a vertically upward conduit channel through which the wires are to be pulled, the wire cart of the present invention may be orientated such that the wire collator outlet through which all of the wires from the various spools are dispensed may be positioned at or below the conduit opening. With such a conduit outlet having a vertically downward conduit channel through which the wires must be pulled, the wire cart of the present invention may be reoriented such that the wire collator outlet is positioned at or above the conduit opening. The wire cart of the present invention may further be reoriented to position the wire collator outlet in proximity to a wall mounted junction box or breaker box to facilitate wire pulling therethrough or for overhead installations.

In one embodiment to the present invention the wire cart may be held in a particular location relative to the conduit opening. Such position may be maintained through the provision of adjustable wall spacers which may be extended or retracted to maintain the wire cart at a predetermined relative location. Such wall spacers may be perpendicularly reoriented based on the orientation and application of the wire pulling installation through a conduit outlet, junction box, overhead installation, etc.

To enable portability of the wire cart of the present invention, one embodiment includes wheels at at least one end of the wire cart frame. Alternatively, wheels may be provided on the height adjustable legs that enable reorientation of the wire collating outlet. Alternatively, the wall spacers may include wheels on which the wire cart of the present invention may be rolled.

In a further embodiment of the present invention, the frame of the wire cart may include pegs on which extra spools of wire may be stored. In a further embodiment, these pegs may be utilized to mate with holes on an underside of the wire cart of the present invention such to provide a modular assembly whereby the number of spools from which wire may be pulled may be increased in a modular fashion through a single wire collator outlet. In a further embodiment, this modularity is provided in a linear fashion, which is particularly useful in installations having restricted areas into which the wire cart may be placed, but which also requires a large number of wires to be pulled.

Therefore, in one embodiment to the present invention a wire cart for use in wire pulling operations whereby an electrician pulls wire through a conduit outlet mounted on a wall and attached conduit to wire a structure is presented. The wire is initially stored on spools. The cart comprises a frame having two ends, a number of spool support rods removably supported at either end of the rod by the frame. The rods have a diameter that is adapted to accommodate placement and rotation of a spool of wire. The cart further includes height adjustable support members attached to the frame at one end. The height adjustable support members are extendable to raise the end of the frame above the conduit outlet to accommodate a wire pulling operation through the conduit outlet to a vertically downward descending conduit. They are also retractable to lower the end of the frame below the conduit outlet to accommodate a wire pulling operation through the conduit outlet to a vertically upward ascending conduit. The height adjustable support members are also extendable to raise the end of the frame into horizontal proximity with the conduit outlet to accommodate a wire pulling operation through the conduit outlet to a horizontal conduit. Preferably, the height adjustable support members include casters on their end. In an alternate embodiment, the height adjustable support members include non-slip feet on an end, and the cart includes a pair of wheels mounted on the frame.

Preferably, the wire cart includes a wire collator outlet coupled to said frame in proximity to one end. In such an embodiment, the height adjustable support members are extendable and retractable to raise and lower the wire collator outlet relative to the conduit outlet. Preferably, the wire collator outlet comprises a hoop. The hoop may be rotatably coupled to the frame. Alternatively, the wire collator outlet comprises a pair of rollers and a hoop. In a further embodiment the second end of the frame is adapted to support the wire cart thereon in a vertical orientation. In this embodiment the height adjustable legs are extendable to provide horizontal support and to maintain a horizontal distance from the conduit outlet during the wire pulling operation.

In another embodiment of the present invention, the wire cart's the height adjustable members are adapted to be reoriented from a height adjustable position to a horizontally adjustable position. In this configuration the members are extended and retracted from the frame to position the end horizontally further from and horizontally closer to the conduit outlet. Alternatively, the wire cart can include horizontal positioning members adjustably mounted to the frame. These horizontal position members are extended and retracted from the frame to position the first end horizontally further from and horizontally closer to the conduit outlet. In a further embodiment the wire cart includes a plurality of pegs mounted on the frame and adapted to accommodate placement of extra spools of wire thereon. Alternatively, the wire cart includes a plurality of pegs mounted on the frame on its upper surface. The frame also includes a plurality of receptacles in its lower surface, which are configured to accommodate the pegs therein to facilitate stacking of wire carts. Such modularity is also accommodated in an alternate embodiment in which the frame defines a male member at one end and a female receptacle configured to accommodate the male member at the other end. This facilitates end-to-end assembly of the wire carts.

In an alternate embodiment of the present invention, a wire pulling apparatus comprises a frame, a plurality of spool support rods mounted within a length of the frame, a pair of support members adjustably mounted transverse to the length of the frame at a first end, and a wire collator outlet mounted in proximity to the first end. In this embodiment the support members are adjustable to raise and lower a height of the wire collator outlet relative to a horizontal plane on which the wire pulling apparatus is placed. In a further embodiment the wire pulling apparatus further comprises a plurality of pegs mounted on the frame, that are adapted to accommodate storage of spools of wire thereon. The frame may also define a plurality of receptacles therein adapted to receive the pegs to enable stacking of one wire pulling apparatus on another wire pulling apparatus. Preferably, the frame defines a second end adapted to support the wire pulling apparatus in a vertical orientation relative to its length.

The present invention also provides a method of facilitating a wire pulling operation through a conduit outlet mounted on a wall and attached conduit to wire a structure. The wire is initially stored on spools. The method comprises the steps of providing a wire pulling apparatus comprising a frame, a plurality of spool support rods mounted within a length of the frame to hold the spools of wire from which wire will be pulled, a pair of support members adjustably mounted transverse to the length of the frame at a first end thereof, and a wire collator outlet mounted in proximity to the first end. The method also requires positioning the wire pulling apparatus in proximity to the conduit outlet, and extending the support members to raise the wire collator outlet above the conduit outlet when the conduit outlet is coupled to a vertically downward descending conduit, and retracting the support members to lower the wire collator outlet below the conduit outlet when the conduit outlet is coupled to a vertically upward ascending conduit. A further method requires the step of extending the support members to position the wire collator outlet into horizontal proximity with the conduit outlet when the conduit outlet is coupled to a horizontal conduit.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 15 is a perspective view of yet a further alternate embodiment of the wire cart of the present invention; and FIG. 16 is an illustration of an embodiment of the wire cart of the present invention configured to be moved from one location to another.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

In view of the above, the present invention provides a wire cart whose orientation relative to an outlet through which wire is to be pulled may be adjusted. This minimizes the risk of damage to the insulation of the wires being pulled and also aids in the smooth accomplishment of the wiring operation. Other aspects of the wiring cart of the present invention greatly reduce the overall cost of a wiring operation and reduce the effort required by the electrician. Such is facilitated by the ability to reorient the wiring cart of the present invention such that the wiring cart may be kept at one location and configured to properly feed the wire through the conduit opening without requiring a second electrician be present to help guide the wire into the conduit opening. In this way, wire pulling in either a vertically upward or vertically downward direction can be accomplished without moving the wiring cart from that physical location.

Figure 1:
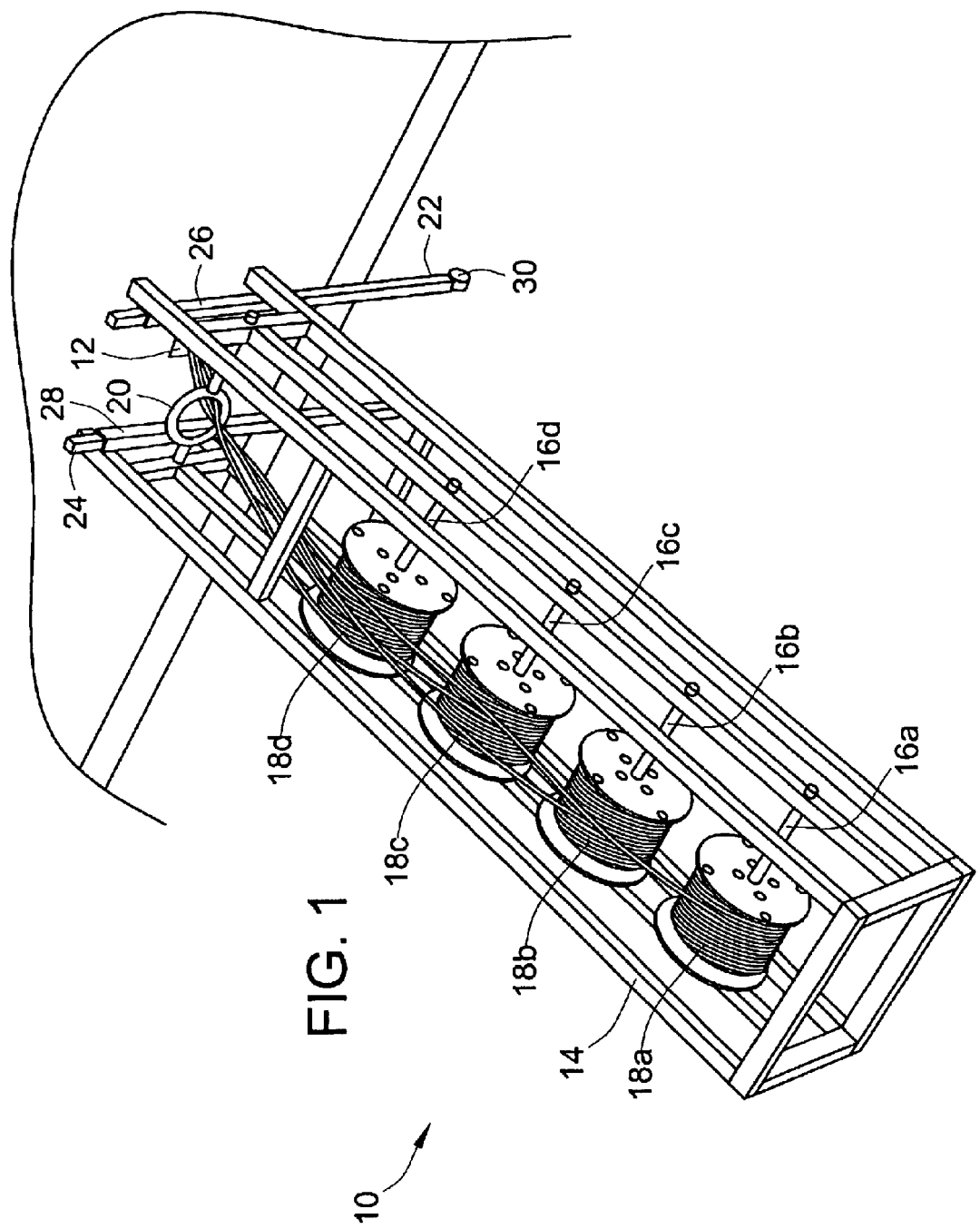
FIG. 1 perspective view of a wire cart constructed in accordance with the teachings of the present invention configured to pull wire through a conduit outlet and through a vertically downward extending conduit.

Referring now to the figures, and in particular to FIG. 1, there is illustrated an embodiment of a wire cart 10 constructed in accordance with the teachings of the present invention oriented to aid in the pulling of wire through a conduit opening 12 which is connected to a vertically downward descending conduit (not shown). This wire cart 10 includes a frame 14 which supports a number of wire spool accommodating rods 16a–b on which spools of wire 18a–d are placed. The number of rods 16 that may be accommodated by the frame 14 is determined by the length of the frame 14, recognizing that the spools of wire are typically provided in standard sizes. The spools of wire 18a–d may be replaced as required or desired by removing the rod on which the spool is located from the housing 14. This may be accomplished by removing a rod end fastener and sliding the rod 16 out of the frame 14. Such rod end fasteners are well known in the art, and may include cotter pins, nuts, caps, etc.

Once the spools of wire 18a–d are positioned on the rods 16a–d within the housing 14, wire is drawn from these spools through a wire collator outlet 20 located within the frame 14 near the forward end of the wire cart 10. This wire collator outlet 20 serves to maintain the various wires within proximity of one another so that they may be more easily pulled therefrom. As illustrated in this FIG. 1, the wire collator outlet may be in the form of a hoop through which the wire is passed. Preferably, the hoop is formed to have rounded edges so as to not scrape the wire insulation being passed therethrough. This hoop 20 may be mounted in a fixed orientation within the frame 14, or may be rotatable about its mounting axis to the frame 14. Such rotation will further aid in the proper guiding of the wire through the wire collator outlet 20 as the wire cart of the present invention is reoriented based upon the type of wire pulling operation that is required.

As illustrated in this FIG. 1, the wire cart is oriented to facilitate the pulling of wire through the conduit outlet 12 which is coupled to a vertically downward descending conduit through which the wire is to be pulled. The orientation of the wire cart 10 is provided by adjustable legs 22, 24. These legs 22, 24 are allowed to slide through sleeves 26, 28 forming a portion of frame 14. Once the legs 22, 24 have been extended to properly position the wire collating outlet 20 relative to the conduit outlet 12, the legs may be locked into place through any number of known mechanisms, for example, locking pins, thumb screws, spring loaded indexable latching mechanisms, etc. In this way, the height of the wire collator outlet may be adjusted to accommodate the physical location of the conduit outlet 12 through which the wire will initially be pulled and the subsequent direction that the wires will traverse. In this embodiment, the legs 22, 24 also include castors or wheels 30 on which the wire cart 10 may be rolled to properly position or transport it.

Figure 2:
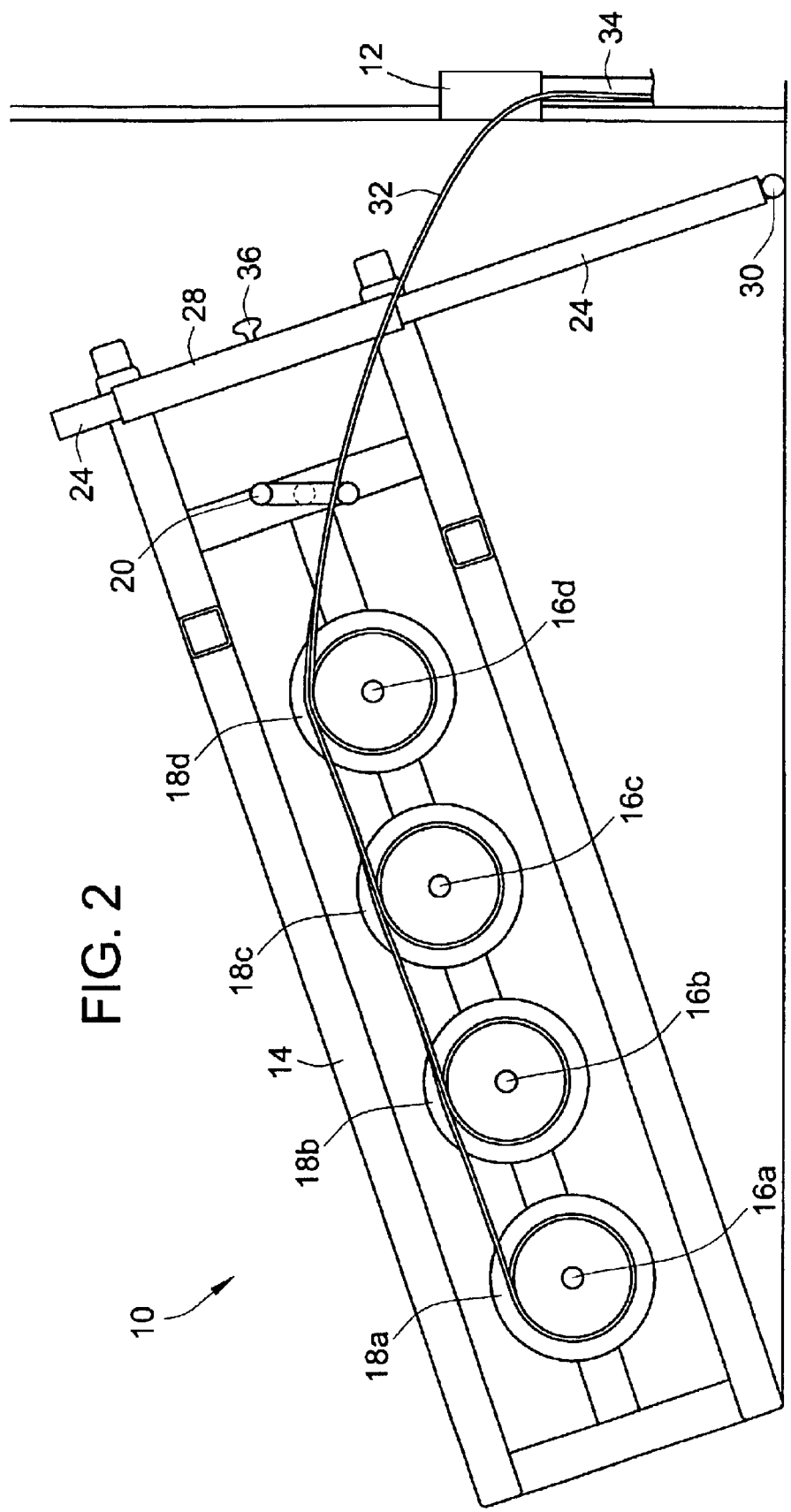
FIG. 2 a simplified side cross-sectional view of the embodiment illustrated in FIG. 1.

To aid in the comprehension of the advantage provided by the adjustability of the wire collator outlet of the wire cart of the present invention, FIG. 2 illustrates a side cutaway view of the embodiment of FIG. 1 by which the flow path of the wire from the cart through the conduit may be discerned. As may be seen, the path of the wire 32 flows from the spools 18a–d through the wire collator outlet 20, into the conduit outlet 12 and through the downwardly descending vertical conduit 34. The bend and flow of the wire 32 as it traverses this path contains no strained bends that are likely to result in chaffing of the wire insulation. That is, by positioning or reorienting the wire collator outlet 20 above the conduit outlet 12 through which the wire must flow, a smooth continuous pulled may be maintained, greatly simplifying the pulling process and providing an assuredness against damaged wires.

As may also be seen more clearly from this FIG. 2, the rotatable wire collator output 20 serves to keep the wires together and promote a smooth flow therethrough. That is, the wire collator outlet 20 does not introduce a significant change in pull direction of the wire flowing therethrough, thereby not impeding the smooth flow during the pulling process. As may also be seen in this FIG. 2, the locking mechanisms for retaining the adjustable leg 24 in position is provided, in this embodiment, by a thumbscrew 36 which may be tightened to prevent further adjustment of leg 24. The positioning of this thumbscrew 36 along sleeve 28 may be changed so long as an adequate length of the leg 24 remains within sleeve 28 to securely hold the cart 10 in its desired position during the pulling operation.

Figure 3:
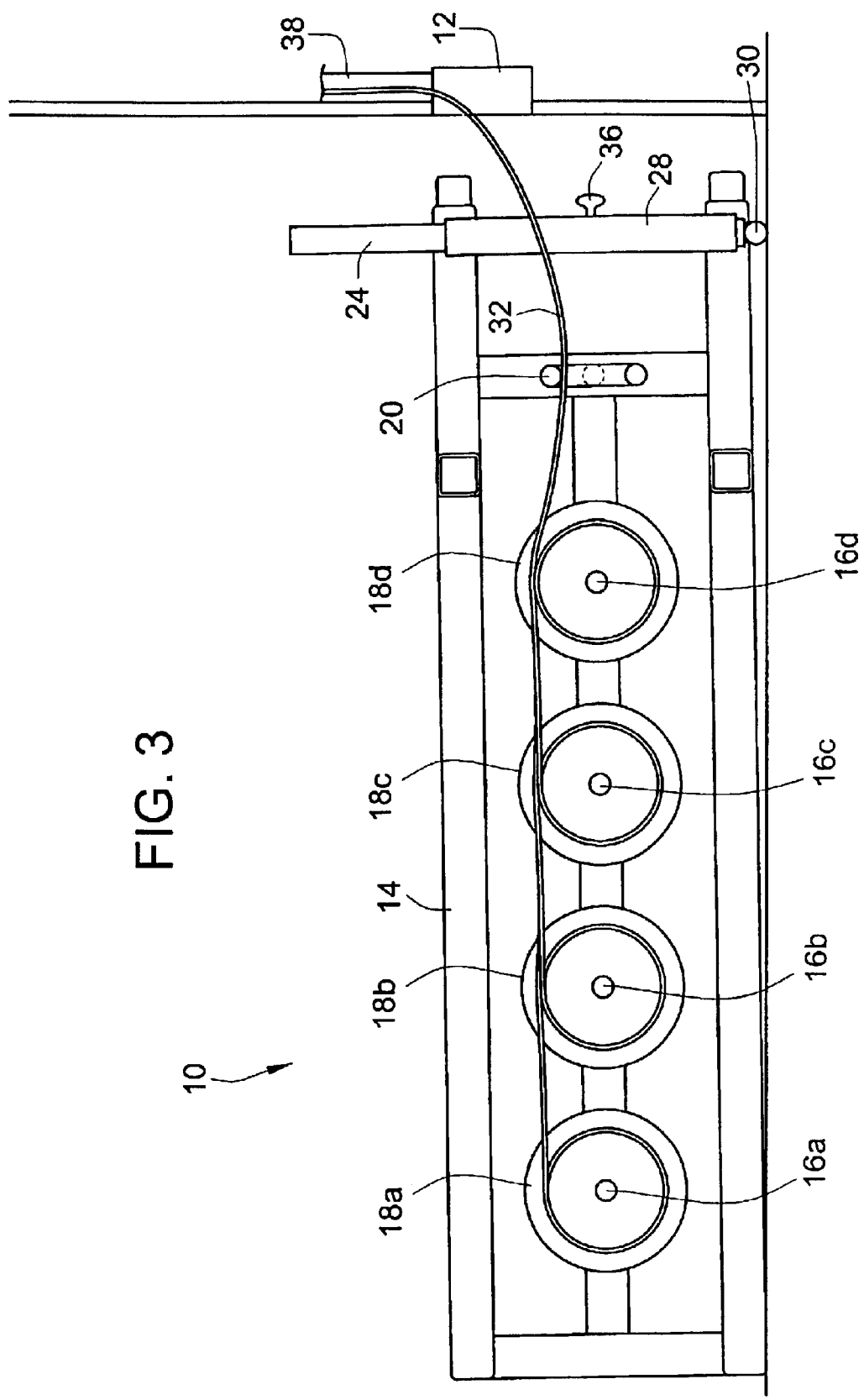
FIG. 3 is also a simplified cross-sectional side view of the embodiment of the wire cart of FIG. 1 positioned to aid in the pulling of wire through a conduit opening attached to a vertically upward extending conduit.

In FIG. 3, the wiring cart 10 of the present invention has been reoriented to position the wire collator outlet 20 below the conduit outlet 12 to facilitate the pulling of wire through an upwardly ascending conduit 38. To achieve this reorientation, the thumbscrew 36 is loosened to allow the adjustable leg 24 to slide through sleeve 28 thereby lowering the relative position of the wire collator outlet 20 relative to the conduit inlet 12. In this orientation, the flow of wire 32 through the wire collator outlet 20 into the conduit inlet 12 and up the vertically ascending conduit 38 is also without abrupt change in direction as would result if the wire collator outlet were positioned above the conduit inlet 12. As reoriented, the wire cart 10 of the present invention facilitates from one given location the smooth pulling of wire without significant threat of damage to the insulation thereon in both vertically upward and downward directions from a single conduit inlet.

Figure 4:
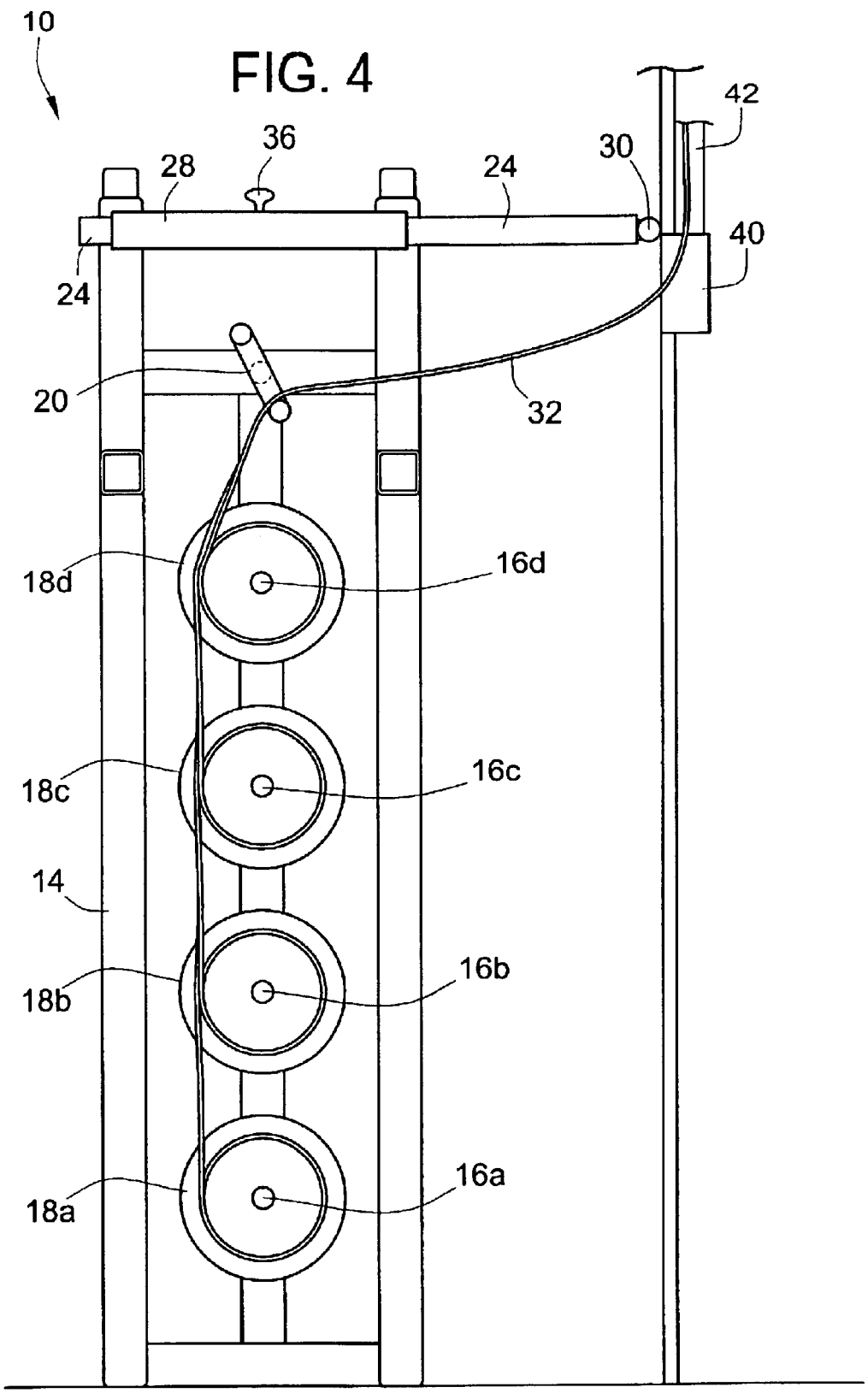
FIG. 4 is also a simplified side cross-sectional view of the embodiment of the wire cart illustrated in FIG. 1 reoriented to aid in the pulling of wire through a junction box having a vertically upward extending conduit attached thereto.

FIG. 4 illustrates a further reorientation of the wire cart 10 constructed in accordance with one embodiment of the present invention. Specifically, the wire cart 10 has been oriented vertically to position the wire collator outlet 20 within close proximity to a conduit junction box 40 having an upwardly ascending conduit 42 attached thereto. To aid in the stability of the wire cart 10 during the pulling operation, the adjustable leg 24 is extended such that its wheel 30 contacts the wall in which the junction box 40 is located. In the embodiment illustrated in FIG. 4, the wire collator outlet 20 is of the swivel type, which rotates during the pulling operation to provide a smooth transition of the wire 30 from the spools 18a–d through the junction box 40 and conduit 42.

Figure 5:
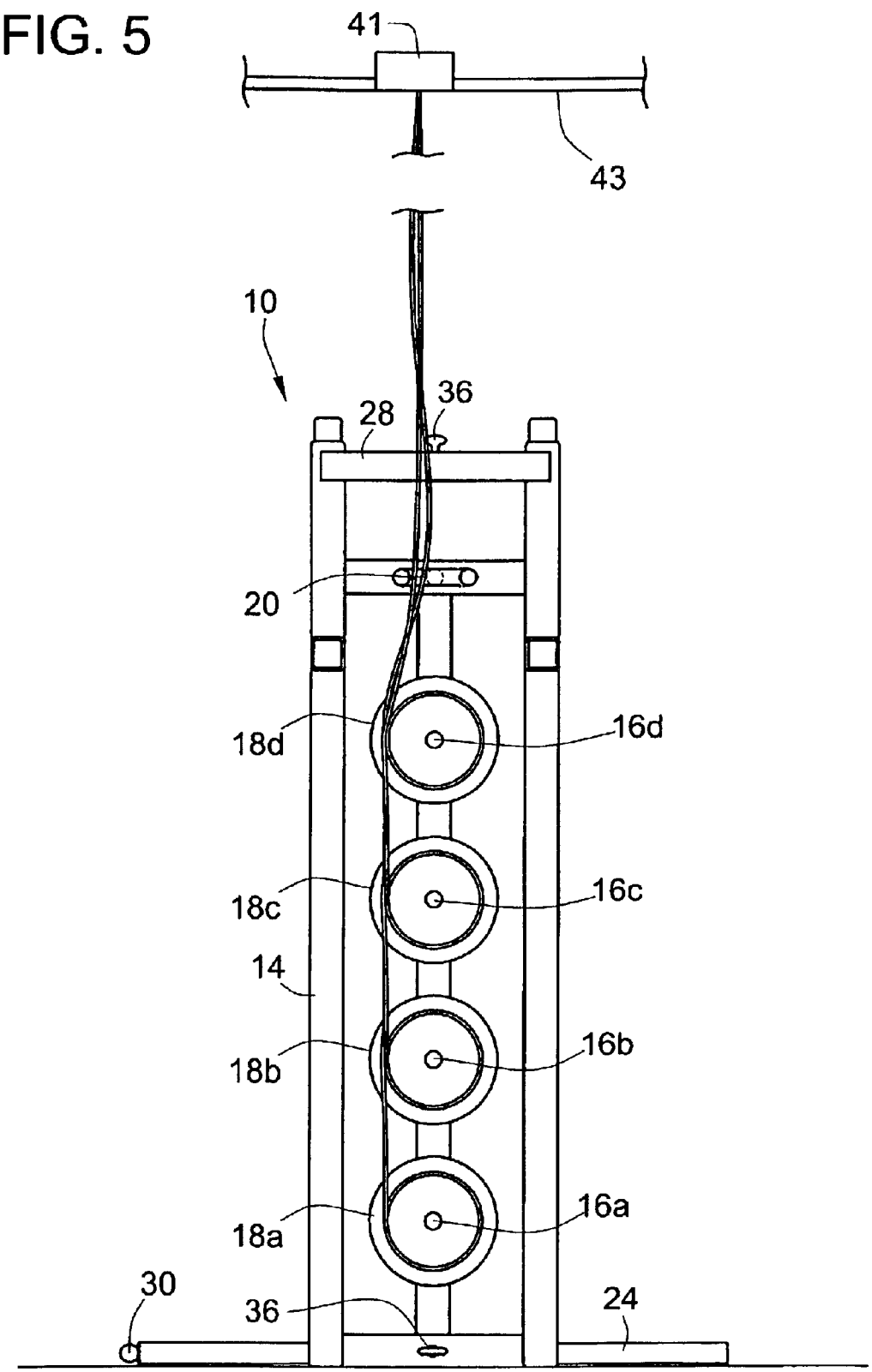
FIG. 5 is also a simplified side cross-sectional view of the embodiment of the wire cart illustrated in FIG. 1 reoriented to aid in the pulling of wire through a junction box located in the ceiling of a structure.

FIG. 5 illustrates a further reorientation of the wire cart 10 constructed in accordance with an embodiment of the present invention. Specifically, the wire cart 10 has been oriented vertically to position the wire collator outlet 20 in vertical proximity below the conduit inlet 41 mounted in the ceiling 43 of a structure to be wired. To provide additional stability of the wire cart 10 in this orientation, the adjustable legs 24 are repositioned to the bottom (in this orientation) of the wire cart 10 to provide a wide base. As in their previous orientations, the legs 24 are slid through the frame of the wire cart 10 and held in place by a thumbscrew 36 or other appropriate mechanism. However, one skilled in the art will recognize that such thumbscrew 36 is optional as there is no force applied to legs 24 to cause them to slide out of position.

As may now be evident from the foregoing description of FIGS. 1–5, a significant advantage is provided by the wire cart of the present invention through its ability to reorient its wire collator outlet with respect to the conduit through which the wire is to be pulled. When the wire is to be pulled in a vertically downward direction, the wire cart is oriented such that its wire collator outlet is positioned above the conduit inlet such that a smooth flow path of the wire may be maintained. Similarly, when wire is to be pulled in a vertically upward direction, the wire cart of the present invention is reoriented such that its wire collator outlet is positioned below the conduit inlet to, once again, maintain a smooth flow path for the wire flowing therethrough. While not specifically illustrated in the foregoing figures, it should be recognized that the wire collator outlet may also be oriented horizontally with the conduit inlet when the wire is to be pulled horizontally therethrough. In each of these orientations, the objective is to minimize the potential damage that often results when conventional wire carts are used that do not provide the ability to adjust the flow of the wire from the cart into the conduit based upon its subsequent path. As discussed above, such prior wire carts often result in damage to the insulation of the wire being pulled therefrom as an abrupt direction change is effectuated by the conduit inlet.

Figure 6:
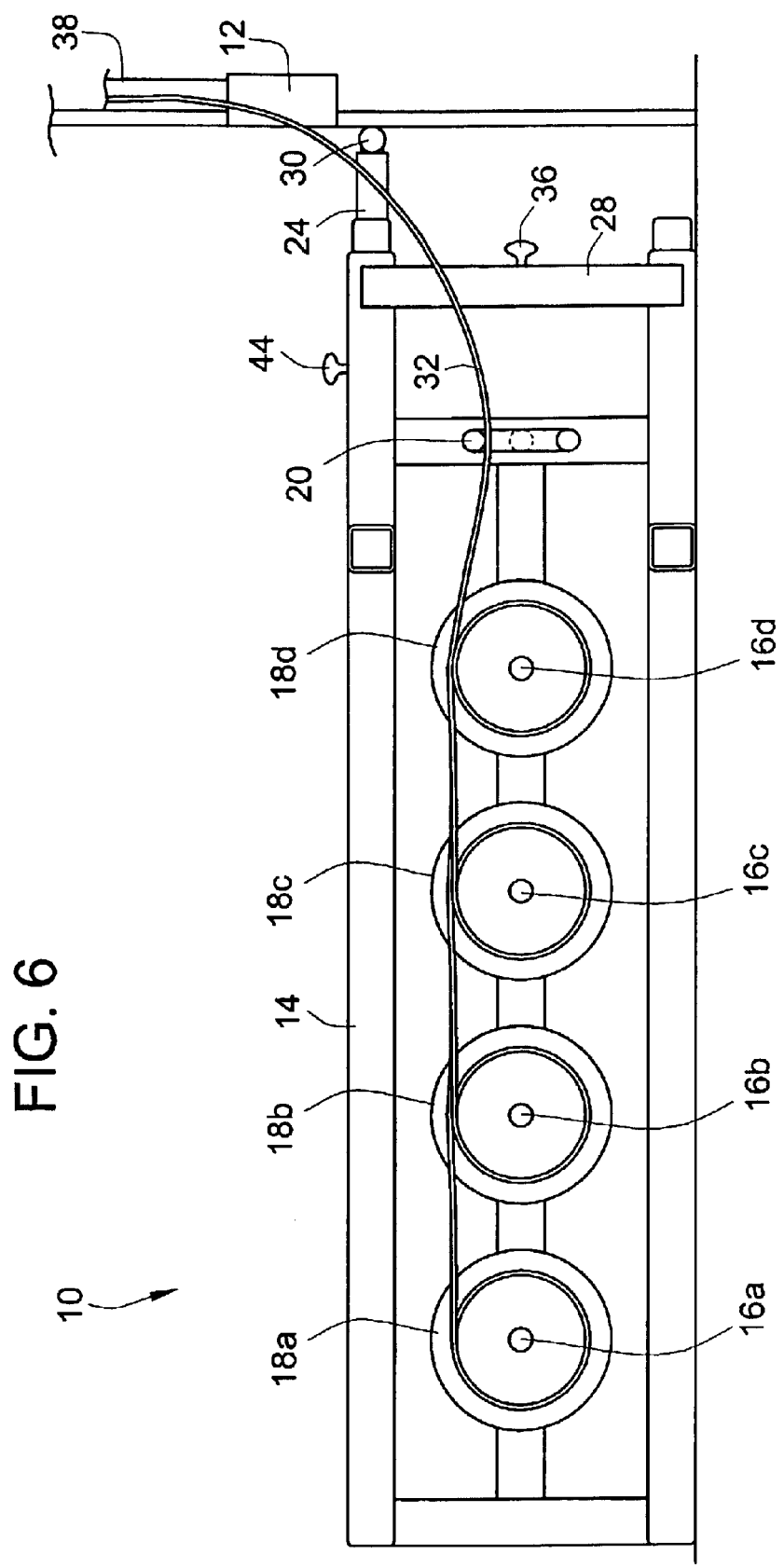
FIG. 6 is also a simplified side cross-sectional view of the embodiment of the wire cart of the present invention illustrated in FIG. 1 reconfigured to maintain a fixed position relative to the wall through which wire is to be pulled.

In a further embodiment of the wire cart of the present invention as illustrated in FIG. 6, the adjustable leg 24 may be removed from sleeve 28 and inserted through the end of frame 14. The position of leg 24 within frame 14 may be maintained as discussed above with regard to sleeve 28, and as illustrated in FIG. 6 through the provision of thumbscrew 44. In such an orientation, the adjustable leg 24 provides a mechanism to position the wire cart 10 relative to the wall. By doing so, the wire cart 10 is prohibited from sliding across the floor as the wire is pulled therefrom through conduit opening 12 and conduit 38. In an embodiment of the present invention where only one set of adjustable legs 24 are included, such positioning of the wire cart 10 relative to the wall may be maintained when the wire collator outlet 20 is positioned above the conduit inlet 12 by moving the cart 10 towards the wall until wheel 30 contacts the junction between the floor and the wall.

Figure 7:
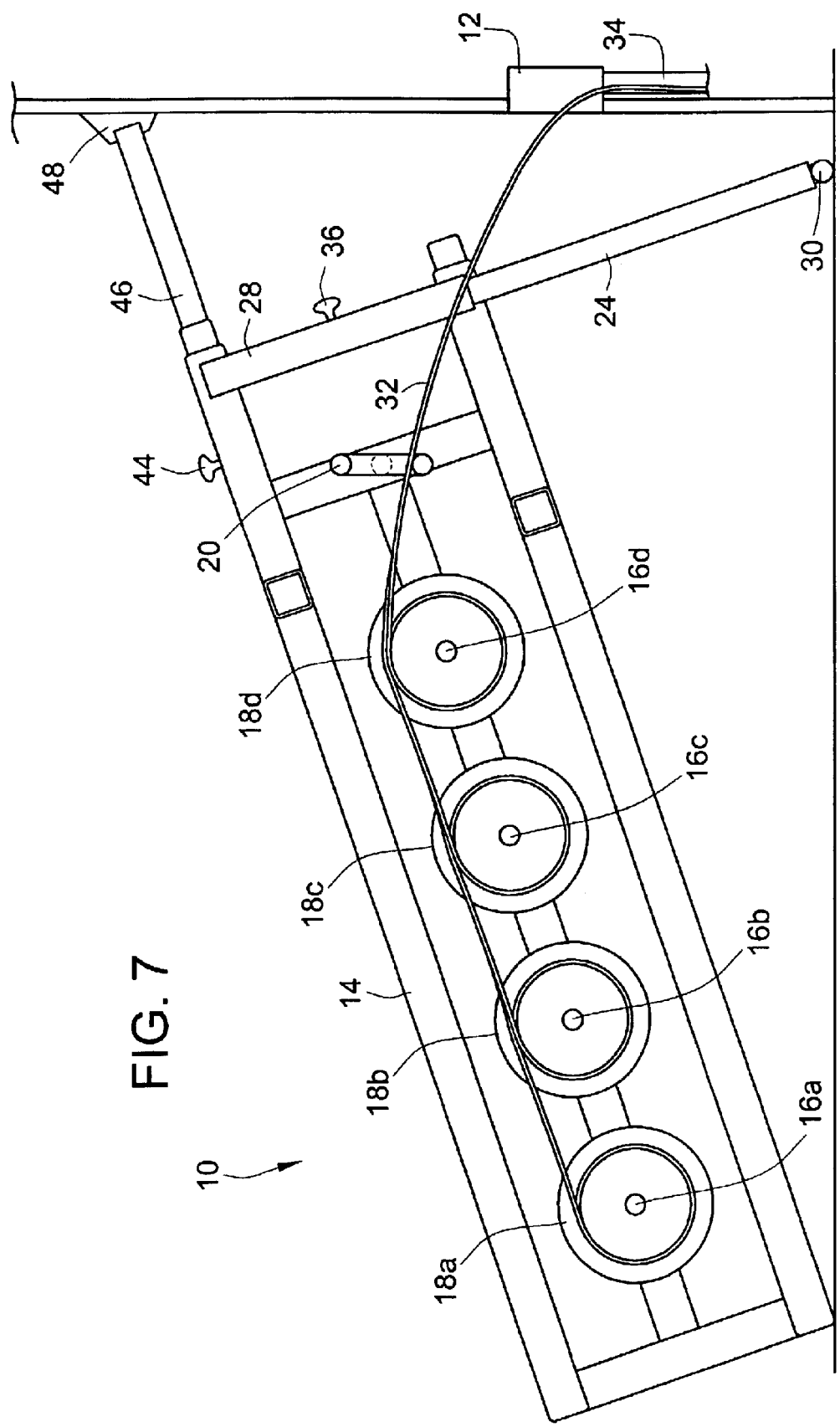
FIG. 7 is a simplified side cross-sectional view of an alternate embodiment of the wire cart of the present invention configured to aid in the pulling of wire through a downwardly extending conduit and to maintain a fixed position relative to the wall through which the wire is to be pulled.

FIG. 7 illustrates an embodiment of the present invention whereby both adjustable height legs 24 and adjustable wall spacers 46 having an end rubberized foot 48 are included. In this embodiment of the present invention, both the relative horizontal and vertical position of the wire collator outlet 20 may be reoriented and positioned relative to the conduit inlet 12 as desired or required by the particular installation. Through the provision of a locking mechanism, such as thumbscrews 36 and 44, both the horizontal and vertical relative positioning of the wire collator outlet 20 may be maintained during the entire pulling operation. Once both the horizontal and vertical position of the wire collator outlet 20 have been set, the electrician may proceed to conduct his pulling operation without concern that the wire cart 10 may move to a position which would introduce undesired scraping of the wires during the pulling operation. As such, a second electrician is no longer required to monitor the conduit inlet 12 during the pulling operation as was typically required with prior wire carts.

Figure 8:
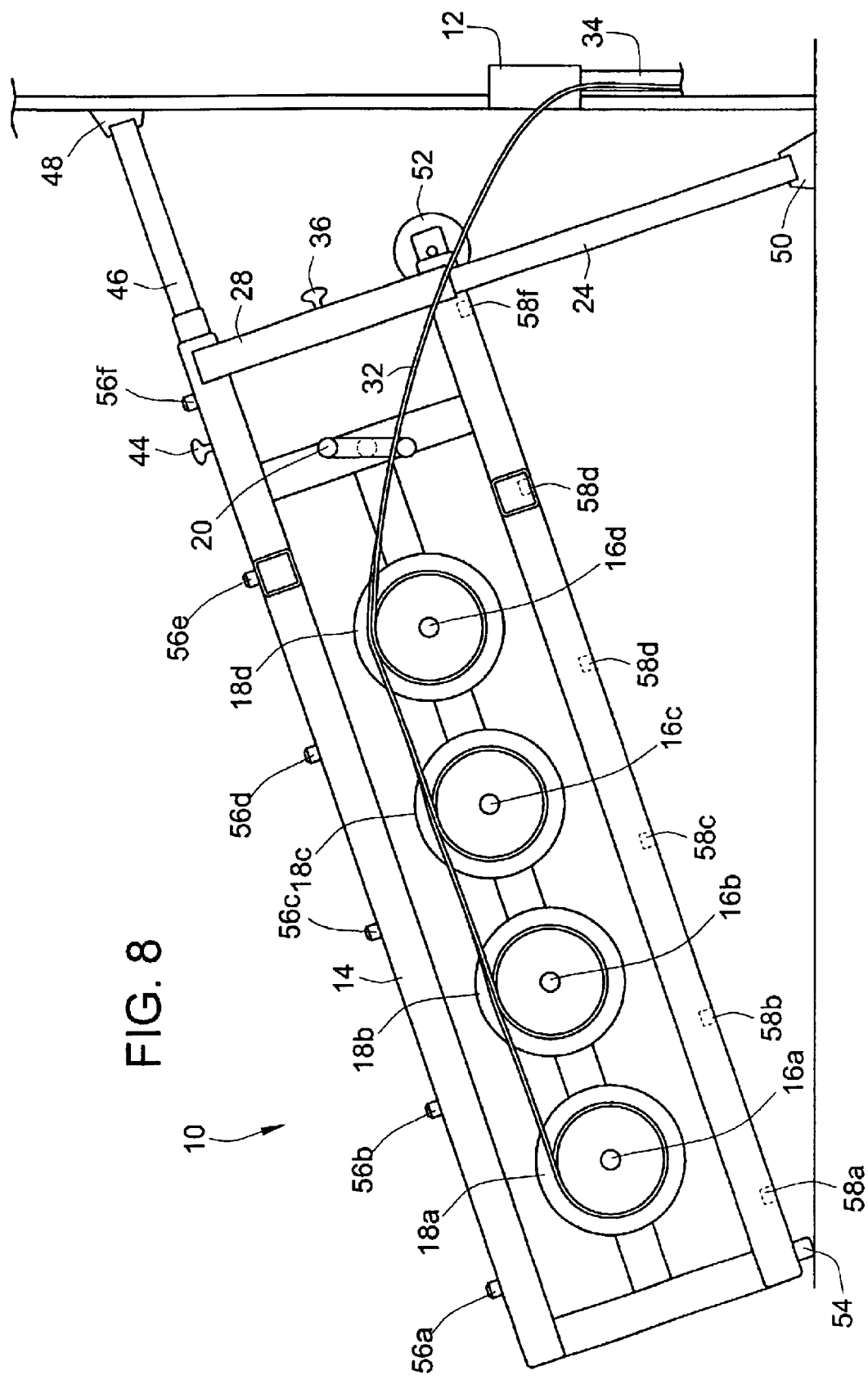
FIG. 8 is a simplified cross-sectional view of a further embodiment of the wire cart of the present invention having a frame mounted wheel and utilizing vertical and horizontal positioning legs.
Figure 9:
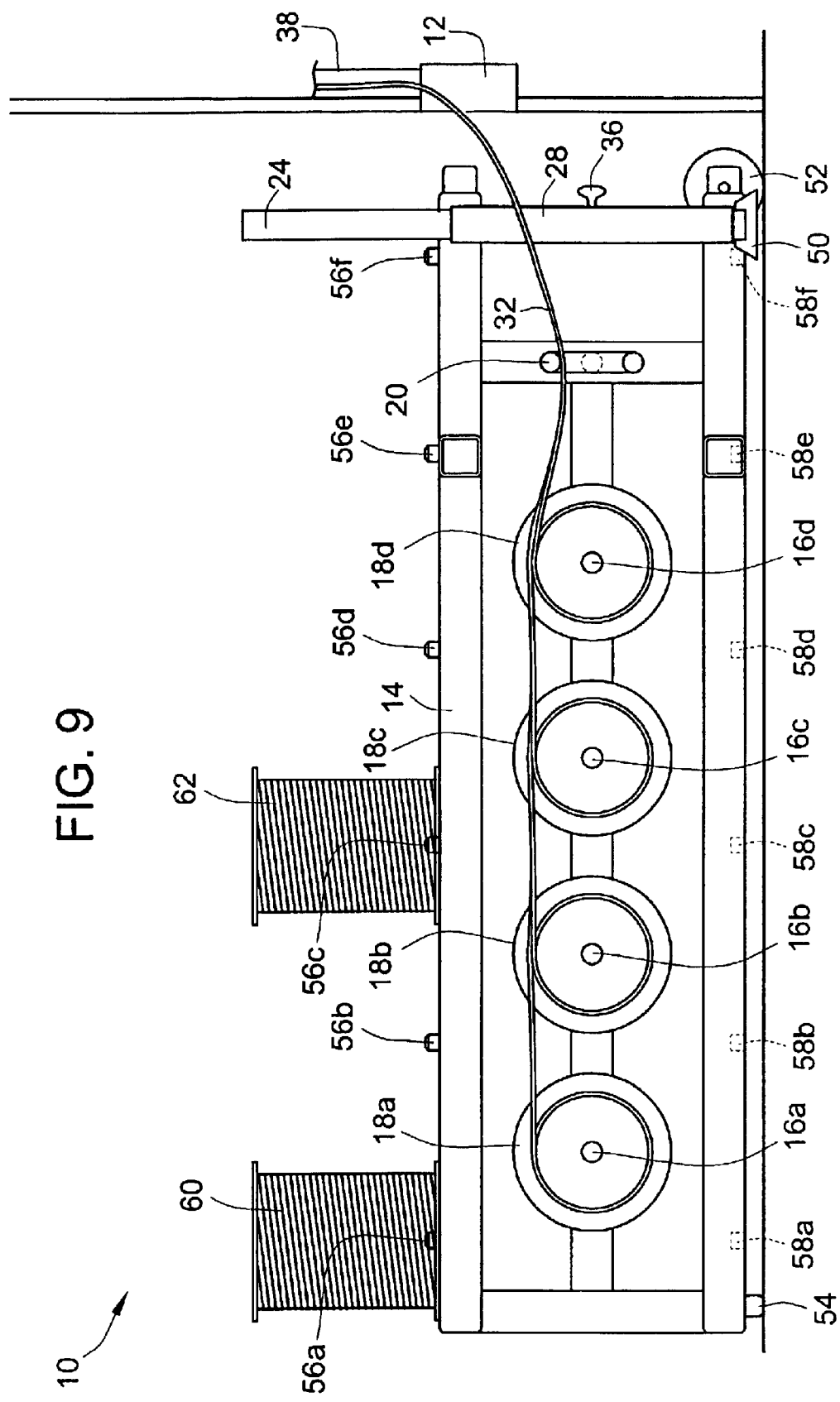
FIG. 9 is a simplified cross-sectional side view of an embodiment of the wire cart of the present invention illustrating additional aspects thereof.

In a further embodiment of the present invention illustrated in FIG. 8, both of the adjustable legs 24, 46 are tipped with rubberized feet 48, 50 to aid in the proper horizontal and vertical positioning of the wire collator outlet 20 relative to the conduit inlet 12. Preferably, each of these feet 48, 50 include no slip surfaces thereunder that will inhibit the movement the movement of cart 10 during the wire pulling opinion. In such an embodiment, a frame mounted wheel 52 is provided to aid in the portability of the wire cart 10. That is, each of legs 24, 46 may be retracted from their extended positions and the cart 10 may then be transported by rolling it on the frame mounted wheels 52. While the frame mounted wheel 52 is illustrated as being mounted on the end of the wire cart 10 closest the wire collator outlet 20, one skilled in the art will recognize that such wheel may be mounted on the other end of the cart 10 as desired. Preferably, such an embodiment also includes a leg 54 at an end of the frame 14 opposite the frame mounted wheel 52 so that, when leg 24 is fully retracted the frame 14 is level and supported by leg 54 and wheel 52 (See FIG. 9).

The embodiment of the present invention illustrated in FIG. 8 also includes a plurality of frame mounted pins 56a–f. Also included in this embodiment are a plurality of sockets 58a–f within frame 14. These sockets 58a–f are sized to accommodate the pins 56a–f to provide modularity as will be discussed more fully below. The pins 56a–f also provide the ability to hold extra spools of wire 60, 62. To facilitate the holding of such spools 60, 62, one skilled in the art will recognize that pins 56a–f may be lengthened to help prevent the spools 60, 62 from becoming dislodged during transportation of the cart 10. Alternatively, the frame 14 may provide sockets or threaded receptacles to receive different length pins depending on whether additional spools are to be placed there on or if the pins are to be used to construct a modular wire cart as will be discussed with regard to FIG. 10.

Figure 10:
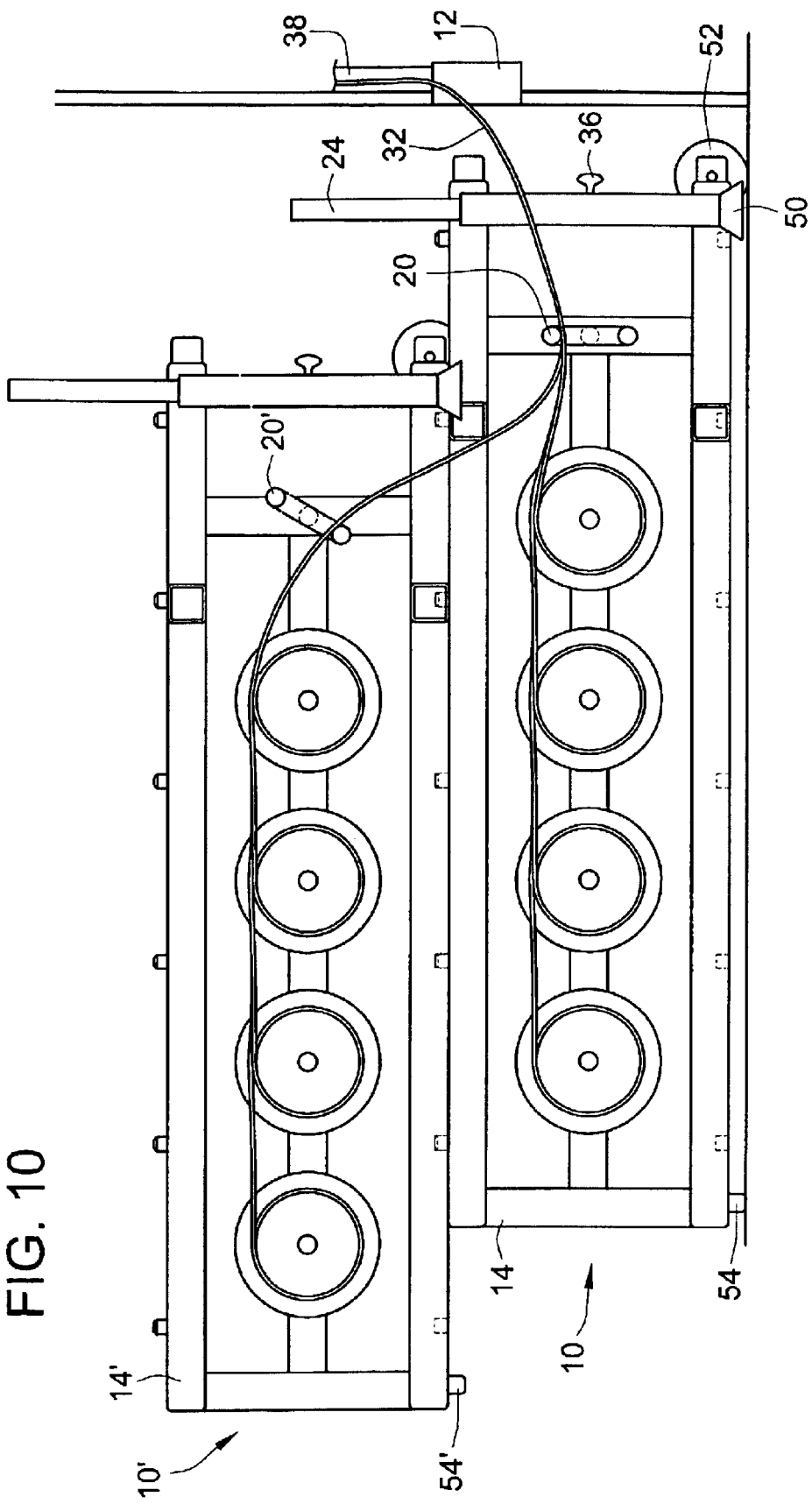
FIG. 10 is a simplified side cross-sectional view of a modular wire cart assembly constructed in accordance with adhesions of the present invention and positioned to aid in the pulling of wire through a vertically upward extending conduit.

As illustrated in this FIG. 10, the number of spools from which wire may be pulled may be increased in modular fashion by mating the pins of one wiring cart 10 with the sockets of another wiring cart 10'. To aid in the smooth flow of wire from the numerous spools through the final wire collator outlet 20, the second wire cart 10' may be mounted on cart 10 so that its wire collator outlet 20' is laterally behind the final wire collator outlet 20 through which the wire 32 will be pulled. As may be seen, this promotes a smooth flow through both modular carts 10, 10' to the conduit inlet 12. Additional carts constructed in accordance with this teaching may be added as desired in such a configuration. Preferably, the wires from each additional wire cart will be routed through the wire collator outlet of the wire cart on which it is stacked. In this way, each successive wire collator outlet serves to collate all of the wires flowing therethrough to aid in the wire pulling operation.

Figure 11:
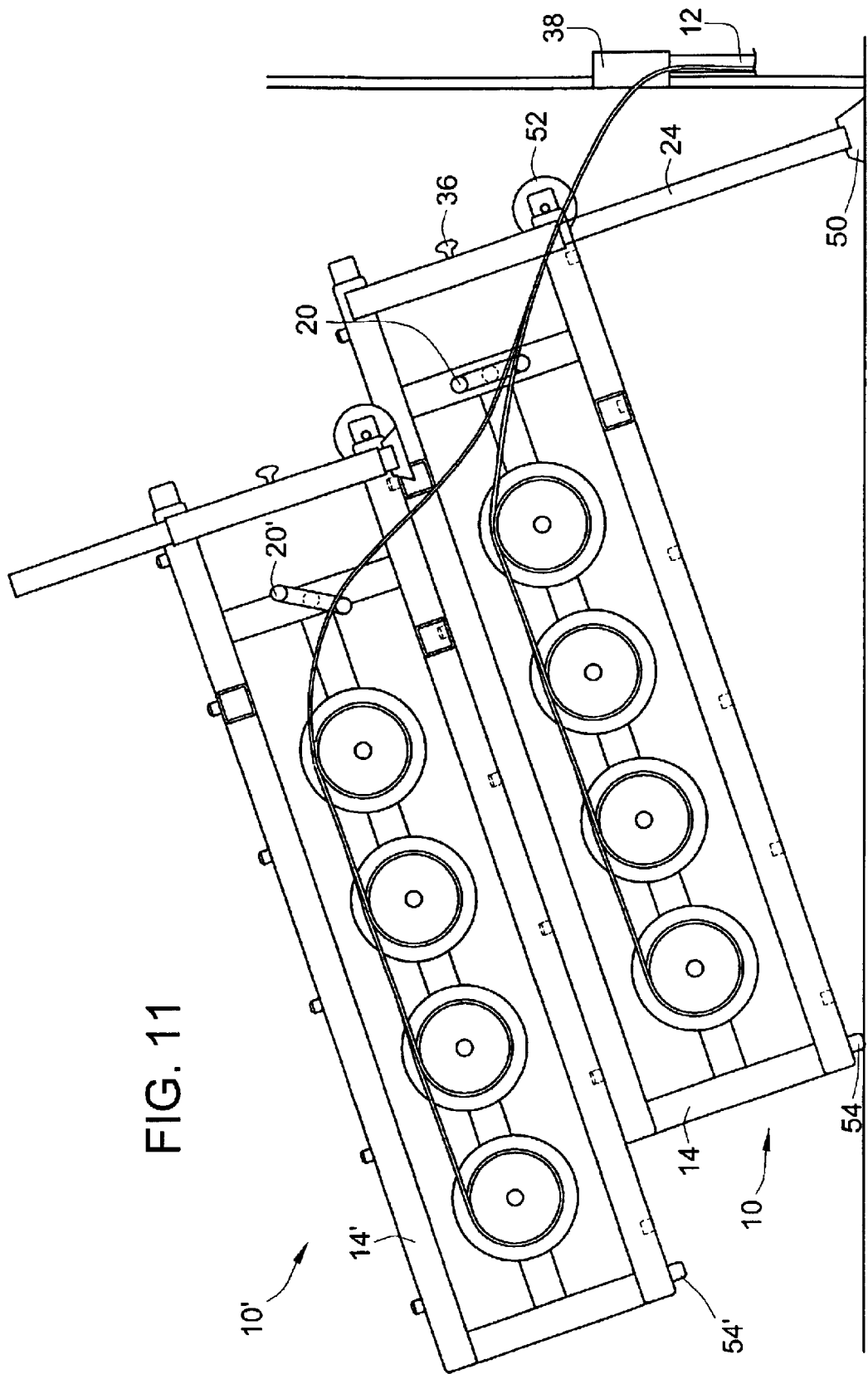
FIG. 11 is a simplified side cross-sectional view of the modular embodiment illustrated in FIG. 10 configured to aid in the pulling of wire through a vertically downward extending conduit.

As illustrated in FIG. 11, the adjustable leg 24 may be extended to reorient the final wire collator outlet 20 relative to the conduit inlet 12 when the wire 32 is to be pulled vertically downward through a downward descending conduit 34.

Figure 12:
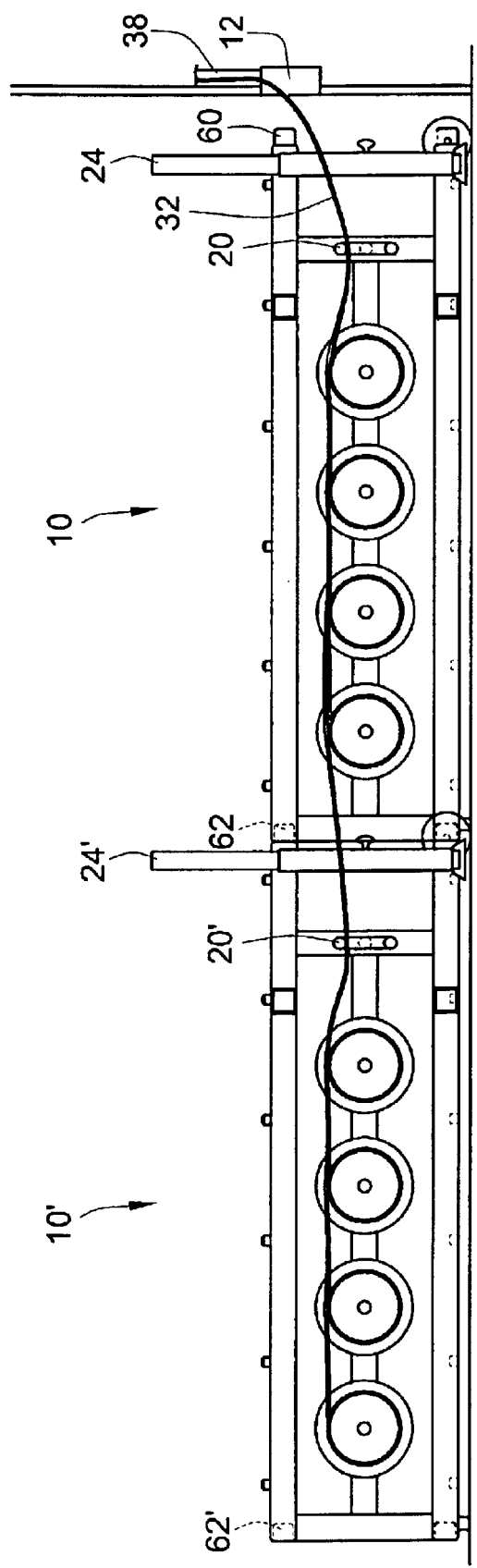
FIG. 12 is a simplified side cross-sectional view of an alternate embodiment of a modular wire cart constructed in accordance with the teachings of the present invention and configured to aid in the pulling of wire through a vertically upward extending conduit.
Figure 13:
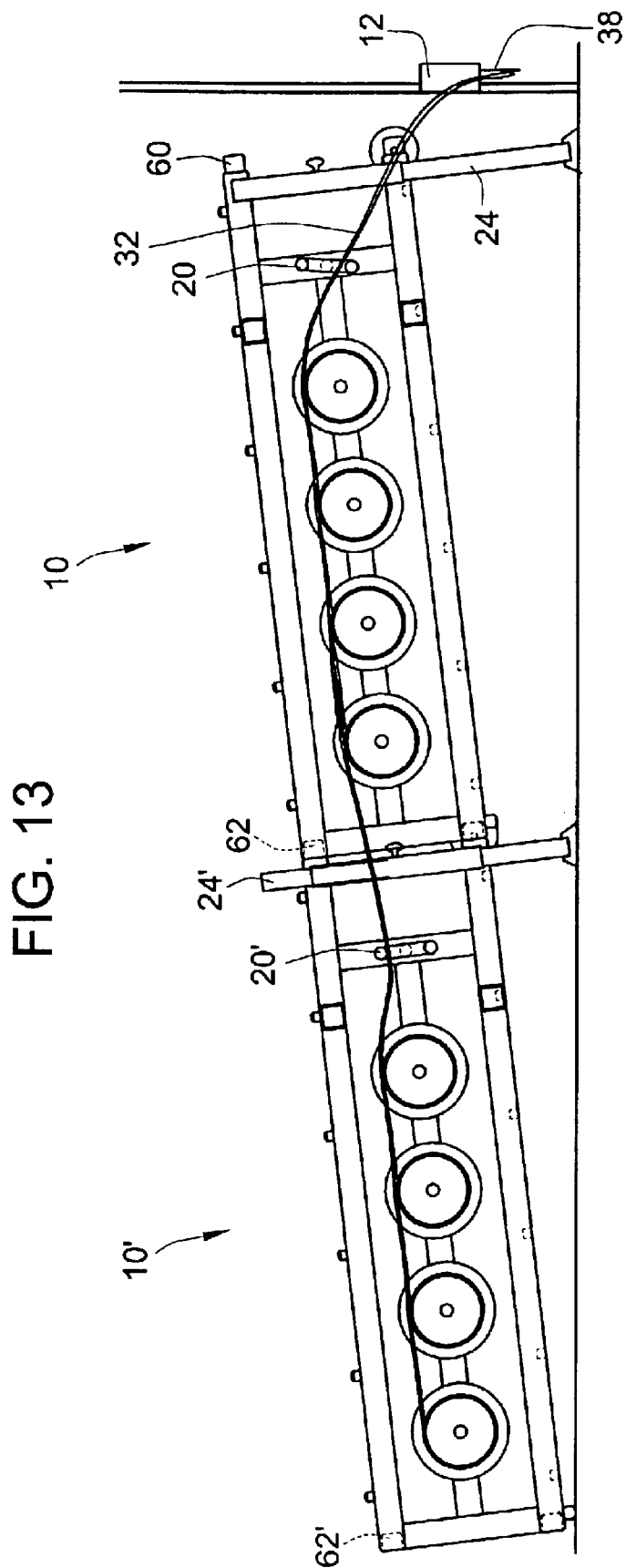
FIG. 13 is a simplified side cross-sectional view of the embodiment of the modular wire pulling cart of FIG. 12 configured to aid in the pulling of wire through a vertically downward extending conduit.

As illustrated in FIG. 12, an embodiment of the present invention also allows for modular construction in a configuration that is particularly useful for installations having very limited space availability. As illustrated in FIG. 12, the wire cart 10 includes a male member 60 on a forward end of the cart 10 and a corresponding female receptacle 62 positioned on the opposite end of the cart 10. In this way, multiple wire carts 10, 10' may be coupled together to form a modular assembly having a low profile. In this configuration the wire is pulled in a linear fashion through the wire collator outlet 20 through the conduit inlet 12 and the conduit 38. As illustrated in FIG. 13, when the wire 32 is to be pulled through a downward descending conduit 34, the extendable legs 24, 24' may be extended to position the wire collator outlet 20 in its proper position and to fully support the length of the modular assembly as so positioned. As will be recognized by those skilled in the art, the length of member 60 in receptacle 62 may facilitate the maintenance of the modular assembly. Alternatively, a locking or securing mechanism may be utilized to maintain the member 60 and receptacle 62. Such mechanisms are well known in the art and include, for example, locking pins, bolts, spring-loaded latching mechanisms, etc.

Figure 14:
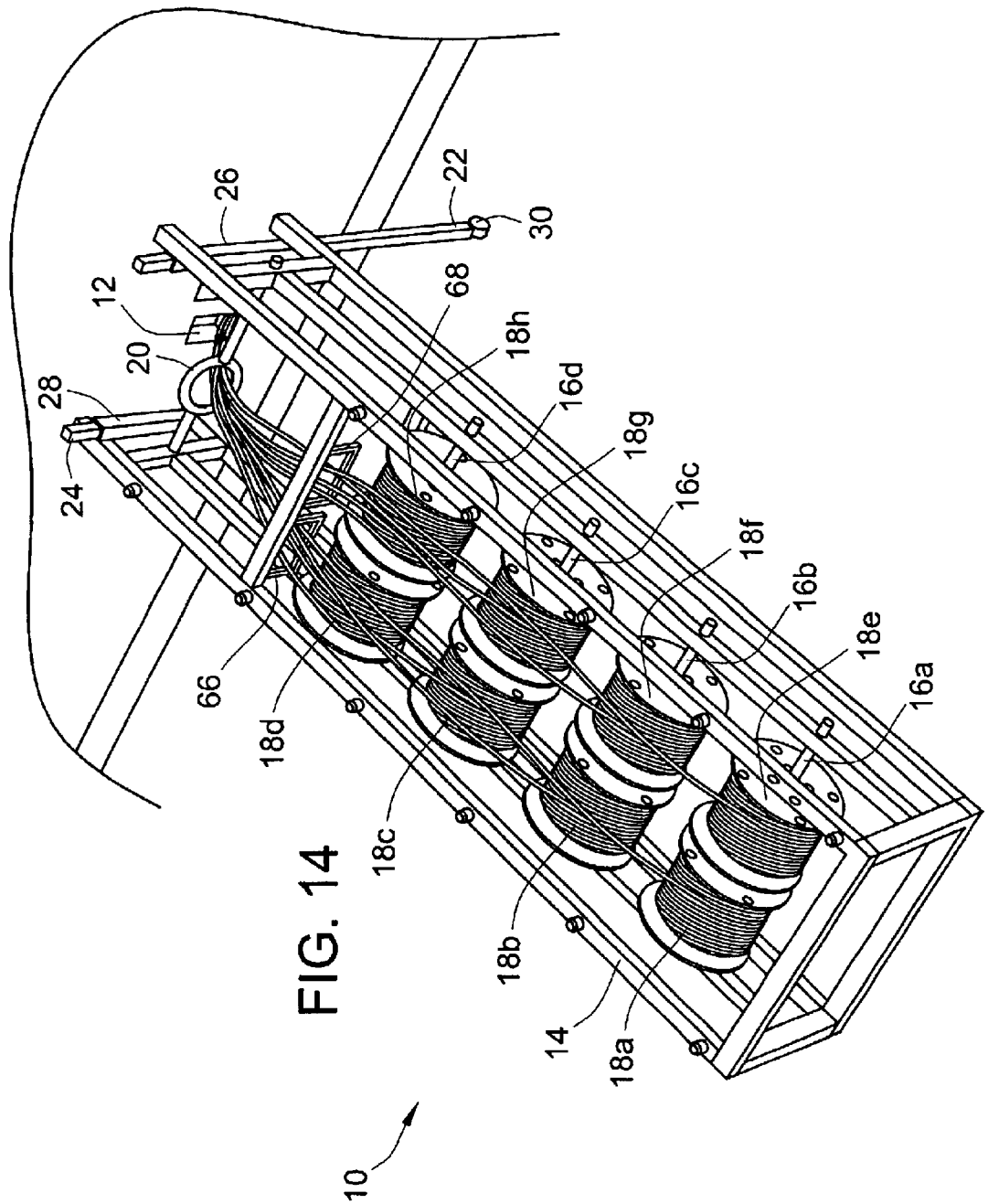
FIG. 14 is perspective view of an alternate embodiment of the present invention configured to carry additional spools of wire.

FIG. 14 illustrates an alternate embodiment to the present invention configured to accommodate additional spools of wire 18e–h. This accommodation is provided by widening the frame 14 and the length of rods 16a–d to accommodate the additional spools of wire thereon. To aid in keeping the wires from each of the in-line sets of spools from tangling, a wire collator 66, 68 is provided for each of the in-line sets of spools 18a–d and 18e–h, respectively. The operation of this embodiment of the present invention is similar to that which is described above, providing adjustable orientation of the wire collator outlet 20 relative to the conduit inlet 12 through which the wire is to be pulled.

FIG. 15 illustrates a further alternate embodiment wherein the wire collator outlet is formed by a pair of rollers 64a, 64b supported in the frame 14. As illustrated, these rollers 64a–b maintain the plurality of wires 32 in close physically proximity so that they may be easily pulled through the conduit opening 12 in much the same way as through the hoop 20 illustrated in the previous embodiments of the present invention. However, unlike the hoop 20 illustrated in the previous embodiments, the rollers 64a–b will actually rotate under action of the wire being pulled there across. Indeed, such rolling action may be provided by any type of rollers mounted within frame 14. However, if conventional roller bars are utilized, such an embodiment will preferably also include a structure to prevent the wires from spreading out laterally across the width of the frame 14. Such structure may take the form of vertical rollers or a simple hoop or wire structure to contain the wire within a lateral proximity of one another.

The portability of the wire cart of the present invention as discussed above is illustrated in one embodiment in FIG. 16. In this FIG. 16 the extendable legs 22, 24 are removed from their sleeves 26, 28 and placed in the frame 14 so as to position the wheels 30 at a farthest most point of contact at the corner of the frame 14. In this configuration a user may lift the opposite end of the wire cart 10 and either push or pull the cart to roll on wheels 30. Such ease of mobility greatly enhances the utility of the wire cart of the present invention.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A wire cart for use in wire pulling operations whereby an electrician pulls wire through a conduit outlet mounted on a wall and attached conduit to wire a structure, the wire being initially stored on spools, comprising:

a frame having a first and a second end;

a number of spool support rods removably supported at either end thereof by the frame, the rods having a diameter adapted to accommodate placement and rotation of a spool of wire thereon;

height adjustable support members attached to the frame at the first end; and wherein the height adjustable support members are extendable to raise the first end of the frame above the conduit outlet to accommodate a wire pulling operation through the conduit outlet to a vertically downward descending conduit; and wherein the height adjustable support members are retractable to lower the first end of the frame below the conduit outlet to accommodate a wire pulling operation through the conduit outlet to a vertically upward ascending conduit;

a wire collator outlet coupled to said frame in proximity to the first end, and wherein the height adjustable support members are extendable and retractable to raise and lower the wire collator outlet relative to the conduit outlet wherein the wire collator outlet comprises a hoop rotatably coupled to the frame.

2. The wire cart of claim 1, wherein the height adjustable support members are extendable to raise the first end of the frame into horizontal proximity with the conduit outlet to accommodate a wire pulling operation through the conduit outlet to a horizontal conduit.

3. The wire cart of claim 1, wherein the height adjustable support members include casters on an end thereof.

4. The wire cart of claim 1, wherein the height adjustable support members include non-slip feet on an end thereof, further comprising a pair of wheels mounted on the frame.

5. The wire cart of claim 1, wherein the second end of the frame is adapted to support the wire cart thereon in a vertical orientation, and wherein the height adjustable support members are extendable to provide horizontal support and to maintain a horizontal distance from the conduit outlet during the wire pulling operation.

6. The wire cart of claim 1, wherein the height adjustable members are adapted to be reoriented from a height adjustable position to a horizontally adjustable position whereby the members are extended and retracted from the frame to position the first end horizontally further from and horizontally closer to the conduit outlet.

7. The wire cart of claim 1, further comprising horizontal positioning members adjustably mounted to the frame, and wherein the horizontal position members are extended and retracted from the frame to position the first end horizontally further from and horizontally closer to the conduit outlet.

8. The wire cart of claim 1, further comprising a plurality of pegs mounted on the frame and adapted to accommodate placement of extra spools of wire thereon.

9. The wire cart of claim 1, further comprising a plurality of pegs mounted on the frame on an upper surface thereof, the frame defining a plurality of receptacles in a lower surface thereof, the receptacles being configured to accommodate the pegs therein to facilitate stacking of wire carts.

10. The wire cart of claim 1, wherein the frame defines a male member at one of the first and second ends thereof and a female receptacle configured to accommodate the male member at the other of the first and the second ends to facilitate end-to-end assembly of wire carts.

11. A wire pulling apparatus, comprising:

a frame;

a plurality of spool support rods mounted in-line within a plane of a length of the frame;

a pair of support members adjustably mounted transverse to the length of the frame at a first end thereof;

a hoop rotatably mounted in proximity to the first end; and wherein the support members are adjustable to raise and lower a height of the hoop relative to a horizontal plane on which the wire pulling apparatus is placed.

12. The wire pulling apparatus of claim 11, further comprising a plurality of pegs mounted on the frame, the pegs adapted to accommodate storage of spools of wire thereon.

13. The wire pulling apparatus of claim 12, wherein the frame defines a plurality of receptacles therein adapted to receive the pegs to enable stacking of one wire pulling apparatus on another wire pulling apparatus.

14. The wire pulling apparatus of claim 11, wherein the frame defines a second end adapted to support the wire pulling apparatus in a vertical orientation relative to its length.

15. A method of facilitating a wire pulling operation through a conduit outlet mounted on a wall and attached conduit to wire a structure, the wire being initially stored on spools, comprising the steps of:

providing a wire pulling apparatus, comprising a frame, a plurality of spool support rods mounted within a length of the frame to hold the spools of wire from which wire will be pulled, a pair of support members adjustably mounted transverse to the length of the frame at a first end thereof, and a hoop rotatably mounted in proximity to the first end;

positioning the wire pulling apparatus in proximity to the conduit outlet;

extending the support members to raise the hoop above the conduit outlet when the conduit outlet is coupled to a vertically downward descending conduit;

retracting the support members to lower the hoop below the conduit outlet when the conduit outlet is coupled to a vertically upward ascending conduit.

16. The method of claim 15, further comprising the step of extending the support members to position the hoop into horizontal proximity with the conduit outlet when the conduit outlet is coupled to a horizontal conduit.

* * * * *